UNITED STATES PATENT OFFICE.

HIRAM W. FAUCETT, OF ST. LOUIS, MISSOURI.

PROCESS OF TREATING ORE.

SPECIFICATION forming part of Letters Patent No. 236,424, dated January 11, 1881.

Application filed July 13, 1880. (No specimens.)

*To all whom it may concern:*

Be it known that I, HIRAM W. FAUCETT, a citizen of the United States, residing at St. Louis, in the county of St. Louis and State of Missouri, have invented new and useful Improvements in Process of Treating Ores, of which the following is a specification.

The object of my invention is to treat all refractory ores containing gold and silver for the purpose of separating such metals from the ore.

It is well known that the chemical nature of all refractory ores is more or less of a silicious character, and by desulphurizing or roasting such ores they are rendered porous. Taking advantage of this fact, I subject the silicious ore to a proper chemical bath under pressure, which effectually disintegrates the ore by decomposing or destroying the silica therein, which silica is the chemical agent in the ore which holds or locks the ore together in a compact mass.

To this end my invention consists, broadly, in subjecting hot crushed ores to the action of disintegrating chemicals in solution while under pressure, the pressure being effected by the steam generated by the contact of the hot ore and the chemical solution in a closed vessel.

In carrying out this process I take the ore, crushed as ordinarily for stamp-mill or smelter, and heat the same in any suitable furnace to a sufficient degree and for a proper time to desulphurize it. I then draw the ore, while at red heat, into an iron retort of proper strength to withstand the proposed pressure, and provided with a steam-tight door, and into this retort, through a suitable aperture, after closing the door, I introduce the chemicals in a state of solution, the steam generated creating such pressure within the retort that the chemicals are forced into the silica or rock of the ore, thoroughly disintegrating the same and freeing the metals therefrom, so that the latter are rendered susceptible of ready amalgamation. The process will be facilitated by agitating the retort.

I use different chemicals, according to the different kinds of ore to be treated, and the quantity required depends upon the quantity of silica or other refractory substances to be decomposed to effect a thorough disintegration of the ore.

For the treatment of most of the refractory ores I use chloride of sodium as a base, and in connection therewith nitrate of potash, cyanide of sodium, and about equal parts of sulphate of protoxide of iron and sulphate of copper, the proportions being about as follows, viz: chloride of sodium, from thirty to forty pounds to the ton; nitrate of potassium, from one to two pounds to the ton; cyanide of sodium, from two to four pounds to the ton; sulphate of protoxide of iron, from one to two pounds to the ton; sulphate of copper, from one to two pounds to the ton. These chemicals are to be dissolved in boiling or hot water of sufficient quantity to cover the ore in the retort. If the ores to be treated are unusually hard or refractory, I add to the above one to two pounds of hydrofluoric acid, or one to two pounds of fluoride of potassium or fluoride of sodium, according to the character of the ore. After the ore has been agitated in the retort a proper time—say from ten to fifteen minutes—under from fifty to one hundred pounds pressure to the square inch, it may be removed while hot to the pulverizer, then passed through any convenient and desired amalgamating process.

It should be here stated that while the ore is in the chemical bath the latter acts to disintegrate the ore by decomposing or destroying the silica therein, and the ore is thoroughly impregnated with the chemicals, thereby effectually disengaging the particles of metal from the silica, which, if not disengaged, will not amalgamate with the quicksilver in the amalgamating-machines.

To facilitate the carrying out of the process, I prefer to use a cylindrical retort mounted on axial trunnions, in order that it may be rotated for the purpose of agitating its contents. The door of the retort should be in its side, and at each end there should be a projecting coupling-nipple provided with a cut-off cock, to which may be connected pipes, one of which leads from the top, and the other from the bottom, of an elevated steam-tight receiver provided with safety-valve, both pipes being provided with suitable cocks. The chemical solution is then placed in the elevated cylinder, and, after the retort has received its charge of heated ore and been closed, the pipes from the receiver are connected to the coupling-nipples and the cocks all opened. The solution will flow from the bottom of the tank to the retort, and the steam generated in the latter will flow to the top of the cylinder, creating a pressure therein which will force the solution rapidly into the retort. After the pressure has decreased, the cocks may then be closed, the pipes disconnected from the retort, and the latter rotated for the purpose of agitating its contents.

The apparatus thus partially described will form the subject of a separate application for Letters Patent.

I do not confine myself to the chemicals or quantities thereof herein enumerated, as they may be varied as required by the character of the ores to be treated.

I am aware that crushed ores have been subjected to the action of chlorine gas under pressure, and that unroasted pulverized ores have been treated with chemical solutions in a closed vessel under pressure created by the injection of steam, and also that hot roasted ores have been treated by placing cold chemical solutions in contact therewith in the open air, or not under pressure; and I do not claim any of such modes of treatment.

What I claim is—

1. The process herein described for separating metals from ores, the same consisting in subjecting hot crushed ores to the action of disintegrating chemicals in solution under pressure, the pressure being effected by the steam generated by the contact of the hot ores with the chemical solution in a closed vessel, substantially as specified.

2. The process herein described for treating refractory ores for disengaging the precious metals therefrom, the same consisting in subjecting hot crushed ores to the action of a solution of chloride of sodium, nitrate of potash, cyanide of sodium, sulphate of protoxide of iron, and sulphate of copper, under pressure, with or without admixture of hydrofluoric acid, fluoride of potassium, or fluoride of sodium, the pressure being effected by the steam generated by the contact of the solution with the hot ore, substantially as set forth.

In testimony whereof I have hereunto set my hand in the presence of two subscribing witnesses.

HIRAM W. FAUCETT.

Witnesses:
ROBT. HARBISON,
JNO. C. ORRICK.